United States Patent [19]

Margraf

[11] 4,345,924

[45] Aug. 24, 1982

[54] FILTER APPARATUS HAVING IMPROVED FILTER BAG SUPPORT STRUCTURE

[76] Inventor: Adolf Margraf, Am Schleplingsbach 46, D-3060 Stadthagen, Fed. Rep. of Germany

[21] Appl. No.: 205,336

[22] Filed: Nov. 10, 1980

[30] Foreign Application Priority Data

Feb. 23, 1980 [DE] Fed. Rep. of Germany ....... 3006823

[51] Int. Cl.³ ............................................ B01D 46/02
[52] U.S. Cl. ..................................... 55/379; 210/323.2
[58] Field of Search ................. 55/294, 302, 365, 378, 55/379; 210/323.2

[56] References Cited

U.S. PATENT DOCUMENTS

| | | | |
|---|---|---|---|
| 4,089,664 | 5/1978 | Noland | 55/379 |
| 4,157,900 | 6/1979 | Margraf | 55/379 |
| 4,194,894 | 3/1980 | Noland | 55/379 |

FOREIGN PATENT DOCUMENTS

| | | | |
|---|---|---|---|
| 2625578 | 12/1977 | Fed. Rep. of Germany | 55/379 |
| 2738942 | 3/1979 | Fed. Rep. of Germany | 55/379 |
| 2806793 | 8/1979 | Fed. Rep. of Germany | 55/379 |
| 2932521 | 8/1979 | Fed. Rep. of Germany | |
| 2354124 | 1/1978 | France | 55/378 |
| 2425829 | 1/1980 | France | 55/378 |

*Primary Examiner*—David L. Lacey
*Attorney, Agent, or Firm*—Balogh, Osann, Kramer, Dvorak, Genova & Traub

[57] ABSTRACT

This invention relates to filter tubes arranged in a gas-dust removing filter apparatus, and adapted to be cleaned by counterflow scavenging. Such filter tubes are provided with a seal at the clean gas side of a perforated partition which subdivides the filter apparatus, containing the filter tubes, into a dust-removing chamber and a clean gas chamber. The seal includes a clamping frame to grip the rim of the open mouth of a filter tube in resilient manner between itself and the partition. The filter tubes, which are inserted into the dust-removing chamber by way of the perforations of the partition, are each provided with a rigid internal spacing element. Further, in accordance with the invention, the clamping frame is connected to a spring means which engages the spacing element inside a filter tube, and is placeable in a position to bear against the dust-laden gas side of the partition, when being stressed. The parts of the clamping frame and the structure of the spring means connected to the clamping frame, also support, at the partition, the confronting end of the spacing element which terminates in front of the partition.

9 Claims, 13 Drawing Figures

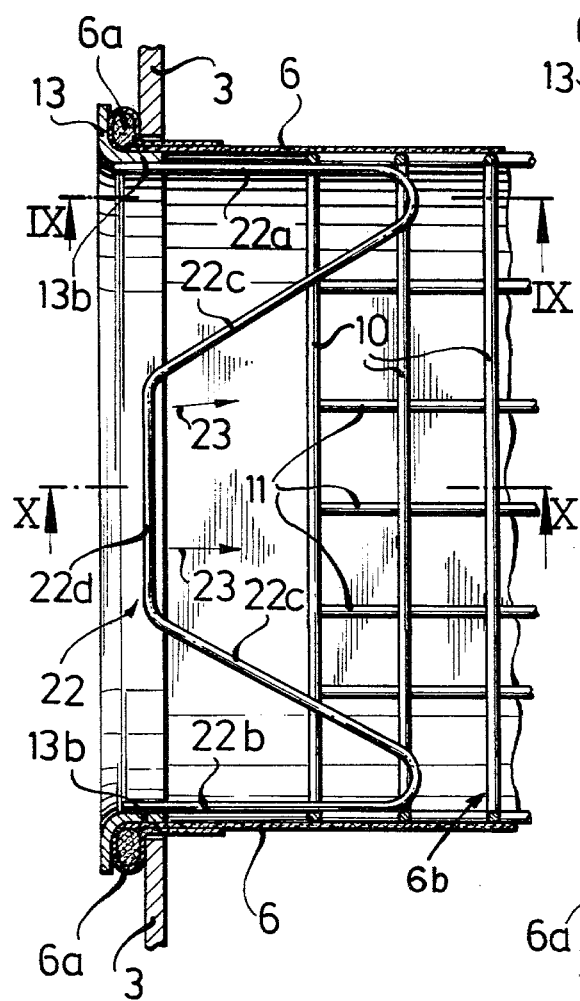
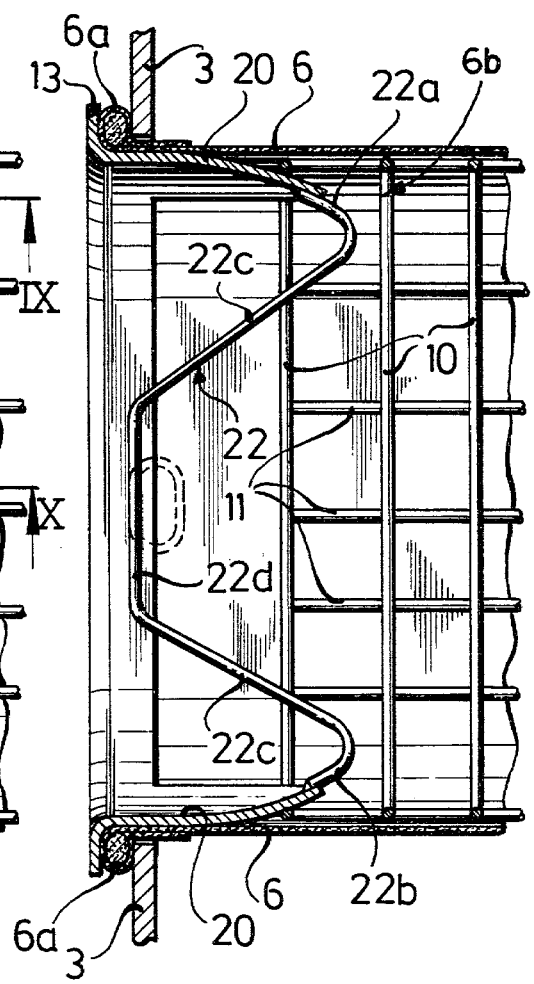

FILTER APPARATUS HAVING IMPROVED FILTER BAG SUPPORT STRUCTURE

BACKGROUND OF THE INVENTION

The present invention relates generally to a gas-dust removing filter apparatus having filter tubes or bags arranged to be cleaned by counterflow scavenging, and particularly to seals for such filter tubes or bags at the clean gas side of a perforated partition which subdivides a casing, of the gas-dust removing filter apparatus, into a dust-removing chamber and a clean gas chamber. The seal is of the kind including a clamping frame to grip the rim of the open mouth of a filter tube or bag in resilient manner between itself and the partition. The filter tubes or bags are inserted into the dust removing chamber via the perforations of the partition, and are provided each with a rigid internal spacing element. When the partition is in a vertical plane, the filter tubes or bags are supported in a horizontal position by having their free ends supported at the rear wall of the casing. The partition may also be disposed in a horizontal plane in the casing, and in such an embodiment, the filter tubes or bags may be suspended vertically from the horizontal partition. A conventional seal of the kind described above is illustrated in German Pat. Application No. P 29 32 521.1. This disclosure teaches a clamping frame for gripping the rim of a filter tube mouth which is connected to a tension spring acting on the rim of the tube when placed under stress. The other end of the spring is firmly connected to a spacing element disposed inside the filter tube and supporting the same. The effect of this arrangement is to have the spacing element bearing, via a bridge element, on the inner side of the peripheral rim of a perforation in the partition.

It is an object of the invention to simplify the resilient seal of the rim of the filter tube mouth at the clean gas side of the perforated partition and, at the same time, to prevent or minimize the risk of the spacing elements of the filter tubes being carried into the partition holes via the tube material and causing damage to the tubes.

SUMMARY OF THE INVENTION

Accordingly, in a sealing arrangement of the kind described, the invention consists of connecting the clamping frame to a spring means which is placeable in a position to bear against the dust-laden gas side of the partition when being stressed. Also parts of the clamping frame or the structure of the spring wire means are connected to the clamping frame support at the partition, the confronting end of the spacing element of said filter tube or bag which terminates in front of the partition.

In contradistinction to all known tube or hose filters, the spacing element for the filter tubes is henceforth selected to be shorter than the tube length, so that the material of the filter tube can no longer be strained and damaged between the spacing element and the subjacent part of the partition aperture. Furthermore, it is now possible in accordance with the invention, to seal the rim of the open mouth of each filter tube from the clean gas side by the simplest means, without the clamping frame having to be connected in resilient manner to the spacing element. For example, the spring wire linkage system of the clamping frame presses the tube rim at one side against the partition (so that the clean gas side is sealed) and this thrust is obtained by the fact that the spring wire linkage system is resiliently braced against the dust-laden gas side of the partition. Moreover, the clamping frame, with its spring wire linkage system, is so constructed moreover that the end of the spacing element pointing towards the clean gas side is supported in front of the partition within the dust-laden gas chamber, so that the weight of the whole filter section directed towards the partition is transferred to the partition via the clamping frame.

BRIEF DESCRIPTION OF THE DRAWINGS

In order that the invention may be more clearly understood, some embodiments thereof will now be described with reference to the accompanying diagrammatic drawings by way of example and in which:

FIGS. 7 and 8 show two axial sections along the line VII—VII of FIG. 6 after installation of the clamping frame and filter tube or hose spacing element in the filter casing.

DETAILED DESCRIPTION OF PREFERRED EMBODIMENTS

Figure 1:
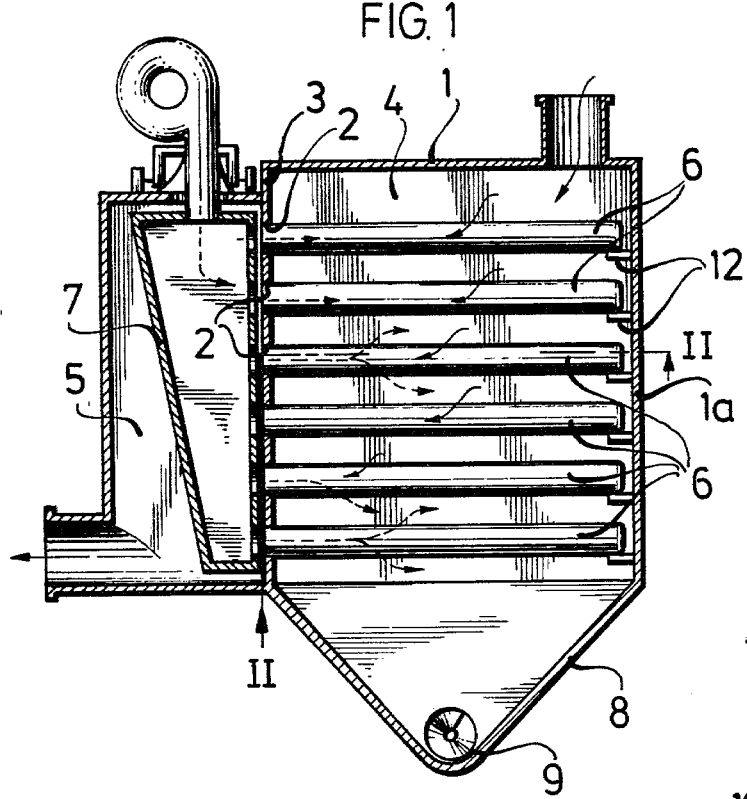
FIG. 1 shows an axial section through a complete tube filter.

Referring now to the drawings, (illustrating a tube filter in use), a filter casing 1 as shown in FIG. 1 is subdivided by a partition 3 having perforations 2, into a dust-removing chamber 4 and a clean gas chamber 5 accessible via large ports. Within the dust-removing chamber 4, horizontal or approximately horizontal filter tubes or bags 6 are arranged in parallel rows beside and above each other and fastened in sealed manner to the partition 3 with the rims of the mouths in coincidence with the partition holes 2. It is also possible however to make use of tube or bag filters in which the partition 3 extends horizontally and the tubes or bags are placed in a suspended, i.e. vertical, position. The filter tubes or bags 6 have the dust-laden gas passed through them from the outside towards the inside, and periodically in reverse direction by pure air for cleaning purposes by means of, for example, a slotted nozzle 7 adapted to be displaced and reciprocated in the clean gas chamber, (the tubes or bags also being vibrated or shaked at the same time if so desired). Instead of the movable slotted nozzles, it is also possible to incorporate fixed nozzles, in the clean gas chamber, for supplying compressed air into each of the tubes. The dust which is periodically freed in the process drops downwardly into a receiving hopper 8 which is provided with a discharge device 9 e.g. in the form of a conveyor.

Figure 5:
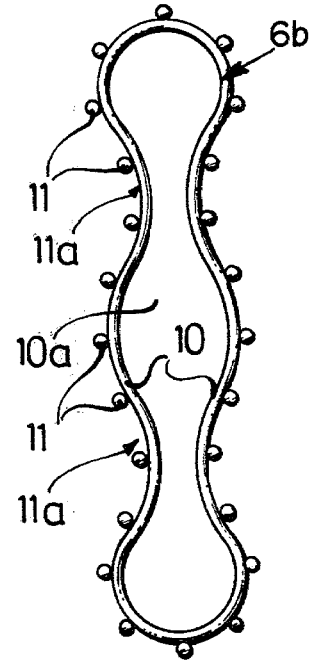
FIG. 5 shows a cross-section through a flattened-oval spacing element for filter tubes.
Figure 4:
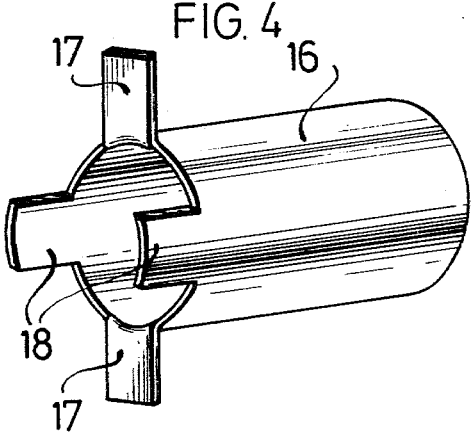
Figure 2:
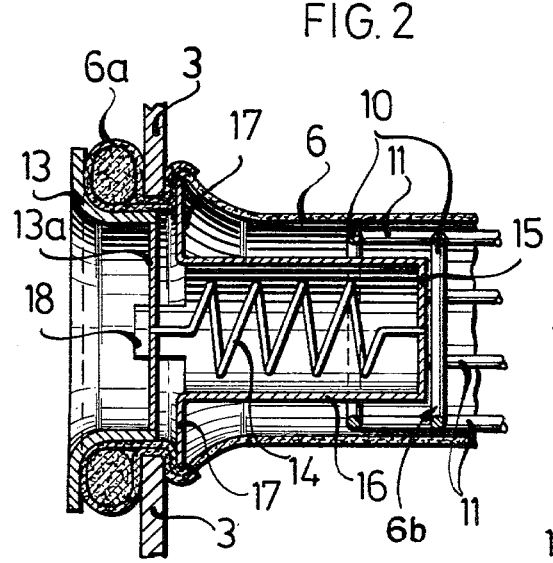
FIGS. 2 and 2a show an enlarged axial section through a partition hole showing the sealing of a filter tube in the ready and clamping positions along the line II—II of FIG. 1, FIGS. 3 and 3a show enlarged axial sections but taken at right angles to these of FIGS. 2 and 2a, FIG. 4 shows an illustration in perspective of a sleeve applied in FIGS. 2 and 3 for sealing a filter tube at the partition of the filter casing.
Figure 3:
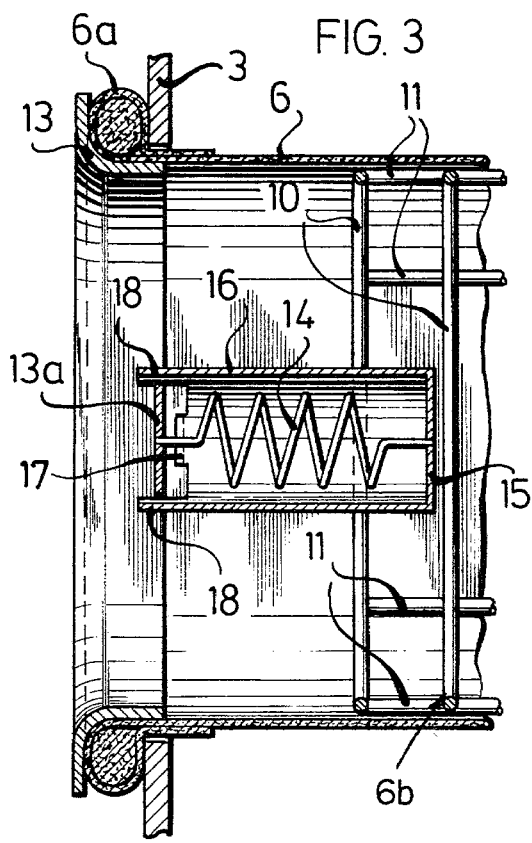

In accordance with the invention, each of the filter tubes or bags 6 is provided with a rigid internal spacing element 6b, e.g. in the form of a "basket" of wire rings 10 in combination with longitudinal wires 11, (as will be seen for example in FIGS. 2, 3 and 5). The spacing element 6b ends in front of the partition 3, i.e. to its right as depicted in FIG. 7. The spacing element 6b, may have a circular, oval or any other desired outline, and in accordance with FIG. 5 for example, it has a cross-sectionally flattened-oval outline with two parallel constrictions 11a. The tubes or bags 6, together with their spacing elements 6b, are supported loosely at their closed ends 12 at the rear wall 1a of the casing.

In accordance with the embodiment shown in FIGS. 2 to 5, a clamping device of the following design is applied for sealing the rim 6a of the mouth of each tube 6.

The clamping device includes a clamping frame 13 which forms no part of the present invention, including a bridging portion 13a. The clamping frame matches the contour of the filter tubes 6 i.e. of the partition holes 2, e.g. it may be circular, oval, or flattened-oval, with the clamping frame overlapping the rim 6a of the tube 6 at the clean gas side. The bridging portion 13a of this clamping frame 13 is connected to one end of a traction spring 14, the other end of which is secured to the remote end 15 of a tubular sleeve 16. At its end next adjacent the partition 3, the sleeve 16 has mutually opposed lateral projections, angled-over portions or the like 17 the ends of which have a mutual spacing which is a little greater than the spacing between two mutually horizontally opposed points of the rim of the partition holes 2. According to this embodiment, the holes or perforations 2 correspond to the outline of the spacing elements 6b which according to FIG. 5, are flattened-oval with the major axis extending in the vertical direction.

Figure 2A:
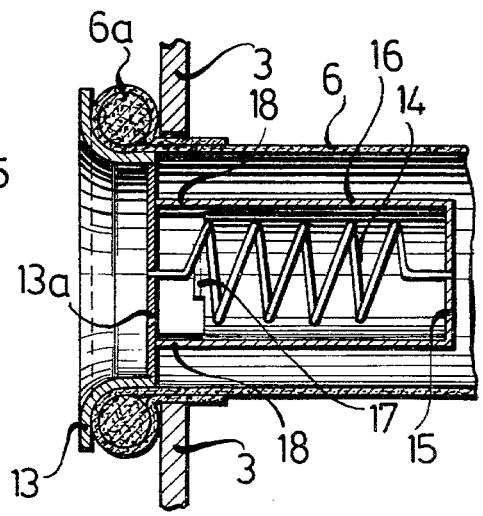
Figure 3A:
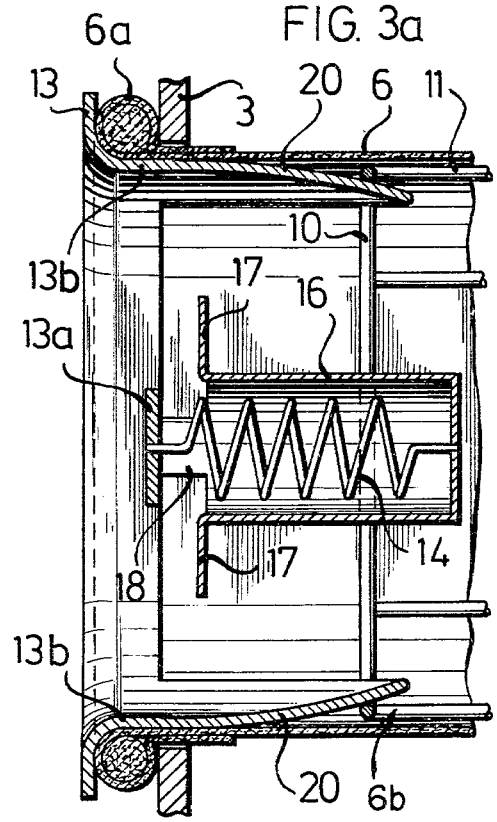

The clamping device 13 described in the foregoing is inserted from the clean gas side 5 into each filter tube 6 (which is provided with a spacing element 6b) with extension lugs 18 extending at right angles to the angled-over portions 17 of the sleeve 16, to initially bear on the horizontally extending bridge 13a of the clamping frame 13, as shown in FIGS. 2a and 3a.

The sleeve 16 is thereupon twisted about its axis through 90° by insertion of an external tool, so that the extension lugs 18 overlap the bridge 13a of the clamping frame 13 under the remaining tension of the traction spring 14 (see FIGS. 2 and 3) and thereby prevent twisting of the sleeve during operation. Moreover, and in particular, the two mutually opposed angled-over portions 17 of the sleeve 16 come into contact with the edge of the partition hole 2 under slight arcuation or bulging out of the filter tube material at the dust-laden gas side (as apparent from FIG. 2). The clamping frame 13 is thereby urged by the tensioned traction spring 14 to press the rim 6a of the mouth of the tube 6 against the partition 3 at the clean gas side, and the sleeve 16 is being pressed resiliently against the partition 3 at the dust-laden gas side, so that a durable and unobjectionable seal of the filter tube is assured at the partition 3. By merely pushing back the sleeve 16 by means of the external tool, and by twisting the sleeve 16 back through 90°, the whole clamping device may be withdrawn out of the open tube end, whereupon a tube may be withdrawn and replaced if, for example it has been damaged or has to be replaced for any other reason.

As already stated, the free ends of the filter tubes 6 are carried by brackets 12 or the like, of any desired kind, at the rear wall of the casing 1a. Since, in accordance with the invention, the spacing element 6b is shorter than the length of the filter tube 6, a support should also be provided for the filter tube in the area of the partition 3. If the spacing element 6b has the contour according to FIG. 5, the space 10a between the two constrictions 11a matches the outline of the sleeve 16. This sleeve 16 then engages with its free extremity the space 10a, (The free extremity of the sleeve penetrating the space 10a). As a result, spacing element 6b (and filter tube 6) is thereby supported on the partition 3 via this sleeve 16 and the clamping frame 13.

If the spacing element 6b has a contour differing from that of FIG. 5, e.g. an outline of known nature, the filter tube may be supported on the partition 3 by providing the annular flange 13b of the clamping frame 13 at the top end and advantageously also at the bottom end thereof with strip-shaped extension strips 20 (The stripes 20 are inclined a little with respect to the axis of the tube 6), which engage with their free ends the confronting extremity of the spacing element 6b (see FIG. 3a), the filter tube thereby being supported in unobjectionable manner. The sleeve 16 then lacks any supportive function.

A simple and particularly advantageous inventive solution concerning the sealing of the rim of the mouth of filter tubes 6 at the clean gas side of the partition 3 (subdividing the casing 1), is shown in the embodiment according to FIGS. 6 to 11. In this embodiment, the annular flange 13b of the clamping frame 13 is connected to two steel spring wires 21 and 22 having their end 21a, 22a firmly connected to the upper part of the annular flange 13b and their ends 21b, 22b to the lower part thereof. The parts 21a, 22a and 21b, 22b initially extend parallel or approximately parallel to the axis of the tube in alignment with the annular flange 13b and so far into the inner portion of filter tube element tube 6 that their ends engage the spacing element 6b (the inside thereof) and support the same together with the tube 6 in the area of the partition 3 and also secure the same against twisting.

Figure 6:
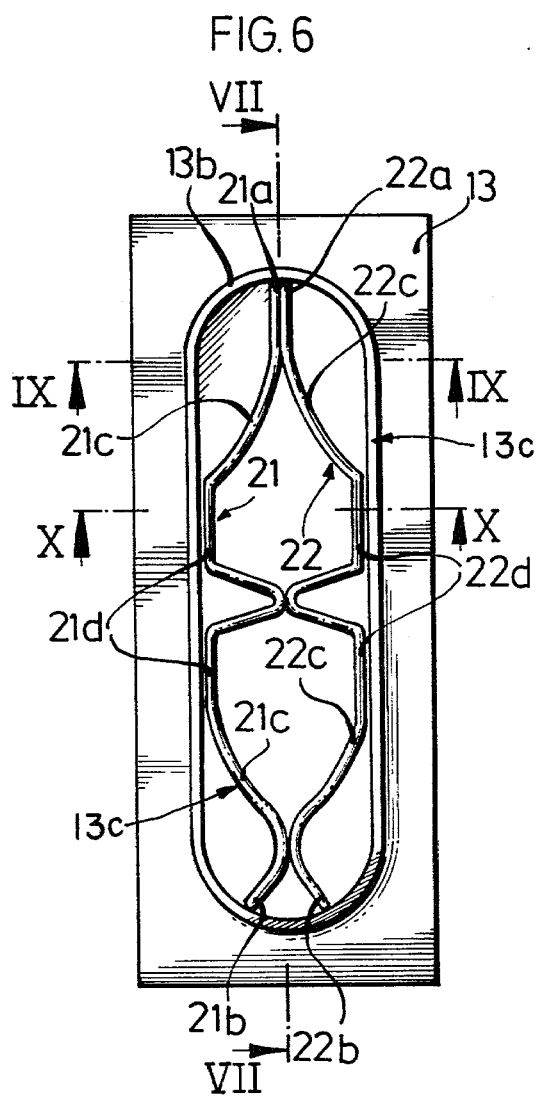
FIG. 6 shows a view of a clamping frame comprising a modified spring wire linkage system, as seen from the dusty gas chamber in the direction towards the clean gas chamber.
Figure 9:
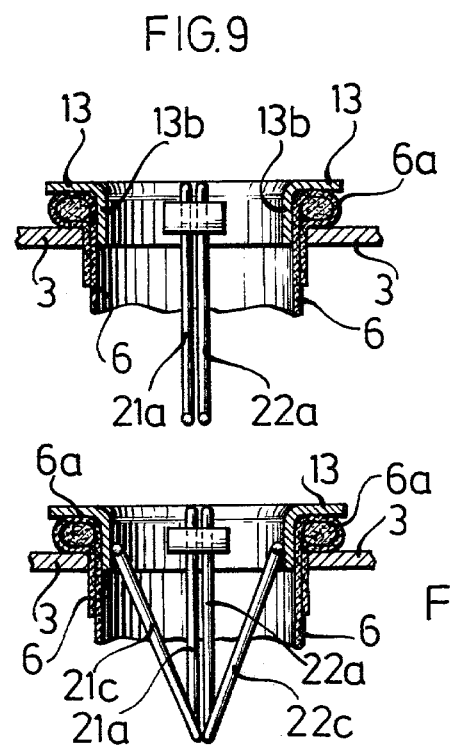
FIG. 9 shows a cross-section along the line IX—IX of FIGS. 6 or 7.
Figure 10:
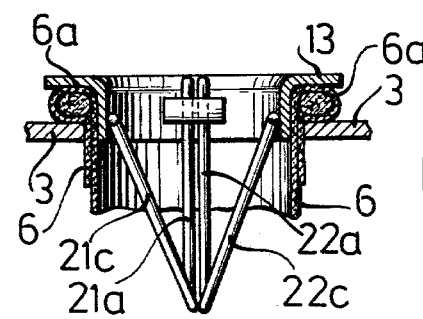
FIG. 10 shows a cross-section along the X—X of FIGS. 6 and 7.

Bent-over portions 21c, 22c of the spring wires 21, 22 then extend backwards into the space surrounded or defined by the annular flange 13b. Parts 21d, 22d projecting into the annular space defined by flange 13c, advantageously extend approximately parallel to the straight annular flange parts as can be seen in FIG. 6.

Figure 11:
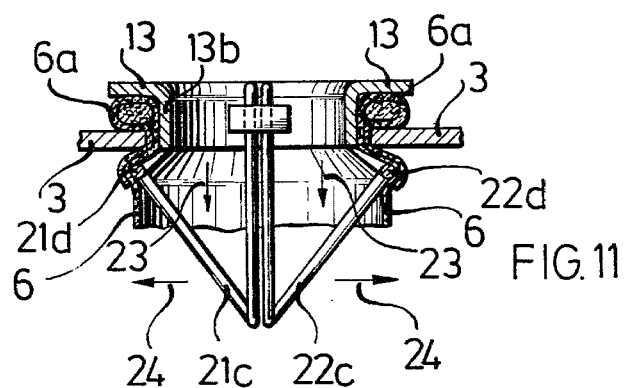
FIG. 11 shows a cross-section identical to that of FIG. 10, but after stressing of the steel spring wire.

After inserting the clamping frame 13 with the annular flange 13b, and the two wire springs 21, 22 into the filter tube 6 (including spacing element 6b), the rim 6a of the tube mouth being gripped at the clean gas side between the clamping frame 13 and the partition 3, the spring wires 21, 22 are pushed by means of a tool from the clean gas side (out of the idle position shown in FIGS. 6, 7 and 10) and into the filter tube 6 in the direction of the arrow 23 (FIGS. 7 and 11), and are then spread apart laterally in the directions of the arrows 24 (FIG. 11) accordingly, the wires 21 and 22 are tensioned in two different directions, so that the spring parts 21d, 22d cause outward bulging of the respective parts of the tube 6 at the partition (FIG. 11). The spring wire parts 21d, 22d under tension then press these bulged-out tube sections outside the annular flange 13b of the clamping frame 13 against the partition 3 at the dust-laden gas side. Due to the tension of the springs, the clamping frame 13 is pressed against the partition 3 at the clean gas side under compression of the rim 6a. The two springs 21, 22 may obviously be integrally formed in a one-piece wire spring, and the annular flange 13b of the clamping frame may be formed according to FIG. 8, (in the same manner as shown in FIG. 3a), the springs 21, 22 then being connected, e.g. to the end of the two strip-like extensions 20. The springs 21, 22 may also be provided with loops, bows or the like for better handling during inward pressing in the direction of the dust-laden gas chamber and during tensioning, (as shown by FIGS. 8 and 6), so that appropriate tools may thereby be attached more easily.

I claim:

1. In a gas-dust removing filter apparatus including a casing provided with a perforated partition which divides the casing into a dust-removing chamber and an accessible clean gas chamber, filter bags inserted into the dust-removing chamber of said casing via one of the perforations of said partition, and arranged to be cleaned by counterflow scavenging, each of said filter bags having a rigid internal spacing element, and being provided at one end thereof with an open mouth disposed at the clean gas side of said partition and a neck portion disposed in the dust removing chamber, and at the other end thereof supported opposite to said partition, and a seal including a clamping frame to resiliently grip the rim of the open mouth of each of said filter bags between itself and the partition, the improvement comprising;

said spacing element terminating in front of said partition, and spring means connected at one end thereof to the clamping frame and at the other end thereof engaging the confronting end of said spacing element, said spring means, when under stress, bearing against said neck portion and being supported together with respective parts of each of said filter bags on said partition at the side thereof of the dust-removing chamber.

2. A filter apparatus according to claim 1, in which each of said filter bags and said spacing element have a flattened oval cross-section, the respective perforation of said partition, adjacent to each of said filter bags, has also said flattened oval cross-section so as to coincide with the open mouth of each of said filter bags, said clamping frame has an annular flange engaging the open mouth of each of said filter bags adjacent to the respective perforation of said partition, and said spring means, which are connected to said clamping frame, comprise a bent steel wire, constructed and arranged such that, at rest position, it projects into the space circled by said annular flange, and when under stress, it thrusts said neck portion so that it bulges out at the outer side of said annular flange in the direction towards the dust-removing side of said partition, so as to thrust said clamping frame against said partition at the clean gas side thereof.

3. A filter apparatus according to claim 2, wherein said steel spring wire comprises spring sections extending in mirror symmetry with respect to the vertical center line of the clamping frame, said spring sections in the unstressed idle condition penetrate into the space of the clamping frame encircled by said annular flange, while in a stressed condition, they are pushed out of said annular flange, in the direction of the dust removing chamber, and at either side of said annular flange exert a thrust in the direction of the dust-removing side of the partition and bulges out said neck portion of each of said filter bags.

4. A filter apparatus according to claim 2, wherein said partition is vertically disposed in the casing, and upper and lower parts of said steel spring wire project in a horizontal direction into each of said filter bags for a predetermined distance such that said parts engage and support the confronting end of said spacing element.

5. A filter apparatus according to claim 2, wherein said annular flange comprises strip-like extensions projecting outwardly from the top and bottom ends thereof, said extensions sloping a little with respect to the central axis of each of said filter bags and engaging the confronting end of said spacing element of each of said filter bags so as to support said spacing element.

6. A filter apparatus according to claim 1, wherein the clamping frame includes a bridging portion, and said spring means comprise a tension spring connected at one end thereof to said bridging portion, and a sleeve for receiving said tension spring, being connected at its inner remote end to the free end of said tension spring, said sleeve being provided with a cylindrical wall and oppositely-situated lateral bent-over portions at the end thereof facing towards said partition, so that when said tension spring is under stress causing the bulging out of said neck portion of each of said filter bags; said bent-over portions are placed in contact with the peripheral rim of the perforations of said partition, at the dust-removing side thereof.

7. A filter apparatus according to claim 6, wherein the cylindrical wall of said sleeve is provided at its end facing towards said partition with oppositely-situated extension lugs extending at right angles to said lateral bent-over portions, and the ends of which have a greater mutual spacing than the width of said clamping frame bridging portion.

8. A filter apparatus according to claim 6, wherein each of said filter bags and said spacing element have a flattened oval cross-section, said spacing element being provided with two parallel constrictions, and said sleeve receiving said tension spring, engages with its free end the inner space of said spacing element between said two parallel constrictions so as to support said spacing element.

9. A filter apparatus according to claim 6, wherein the clamping frame is shaped to correspond to the shape of the perforations of the partition, and positioned and arranged to engage the rim of the mouth of each of said filter bags, and wherein said spring means comprises at least two tension springs connected at one end thereof to the clamping frame and at the other end thereof to the remote end of said sleeve.

* * * * *